April 25, 1933. M. DYSTHE 1,905,824
JOINTED METALLIC HOSE CASING
Filed Sept. 28, 1931
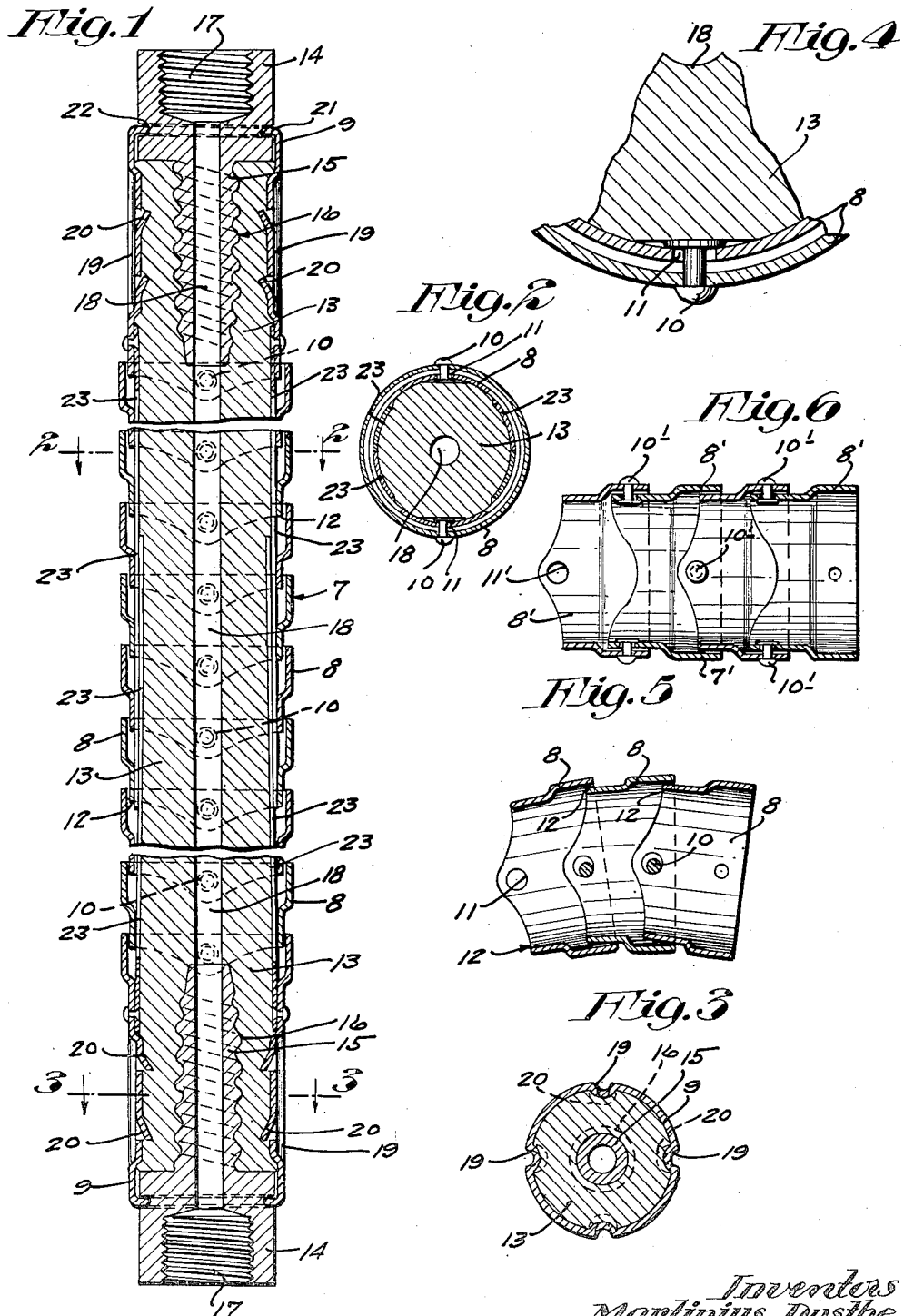
Inventor
Martinius Dysthe
By his Attorneys
Merchant and Gigon Patented Apr. 25, 1933

1,905,824

UNITED STATES PATENT OFFICE

MARTINIUS DYSTHE, OF MINNEAPOLIS, MINNESOTA

JOINTED METALLIC HOSE CASING

Application filed September 28, 1931. Serial No. 565,410.

My present invention relates to a hose casing and more particularly to a jointed metallic hose casing intended for general use but especially adapted for a hose used in connection with the high pressure greasing system for automotive vehicles.

It is well known that a great deal of difficulty is experienced in the bursting of hose sections used in connection with high pressure greasing systems due to the force required to force grease therethrough and into the bearings of automotive vehicles.

The object of this invention is the provision of a jointed metallic hose casing that completely confines a hose section with such restriction as to permit grease or any other fluid substance to be forced therethrough under very high pressure and at the same time permits sufficient angular movements of the hose for its application to the various different nipples in the greasing system of an automotive vehicle.

To the above end, generally stated, the invention consists of the novel devices and combinations of devices hereinafter described and defined in the claims.

In the accompanying drawing, which illustrates the invention, like characters indicate like parts throughout the several views.

Referring to the drawing:

Fig. 1 is a view of the jointed metallic hose casing in longitudinal central section;

Fig. 2 is a transverse section taken on the line 2—2 of Fig. 1;

Fig. 3 is a transverse section taken on the line 3—3 of Fig. 1;

Fig. 4 is a fragmentary detail view showing one of the joints between adjacent links of the casing;

Fig. 5 is a view in longitudinal central section showing a plurality of the casing links with the hose removed and the pivot pins sectioned; and Fig. 6 is a view in longitudinal central section showing a slight modification of the casing.

The numeral 7 indicates a jointed metallic hose casing comprising a multiplicity of axially spaced tubular links 8 and a pair of sleeves 9 which form the end portions of said casing. One end portion of each link 8 is contracted to a smaller diameter than the other end portion thereof and telescoped into the large end portion of the adjacent link 8 and connected thereto by a pair of axially aligned and axially spased pivot pins 10. These pivot pins 10 connect adjacent links 8 for angular movement and, as shown in Figs. 1 to 5, inclusive, are all in the same plane. Said pivot pins 10 have a head on each end, are anchored in the outer or large end portions of the links 8 and loosely extend through holes 11 in the inner or small end portions of said links. The diameter of the holes 11 is considerably larger than that of the pivot pins 10, as best shown in Fig. 5, to permit a limited turning movement of the links 8 in respect to each other about their axes. These joints between the links 8 also give the casing greater angular movement in respect to each other.

To further increase the angular movement of the links 8 in respect to each other the inner or small end portions thereof are cut back at diametrically opposite points, as indicated at 12. These cut back portions 12 are in the form of segmental notches that extend substantially 90° from the axes of the pivot pins 10 and materially increase the internal clearance between connected links 8. The joints 10—11 which permit angular movement of the links 8 in respect to each other also permit the casing 7 to be bent on the line of a relatively sharp curve.

The sleeve 9 on one end of the casing 7 is of the same diameter as the inner end portions of the links 8 and its inner end portion is telescoped into the large or outer end portion of the adjacent link 8. The other sleeve 9 has the same formation as the links 8 except that its body or outer end portion is relatively long. Both joints that connect the sleeves 9 to the respective links 8 are the same as the joints between the several links 8 and are designated by the same reference character.

Extending longitudinally through the casing 7 is a rubber hose 13 to each end of which is applied a coupling head 14 for an adaptor not shown. Formed with each head 14 and projecting axially inward therefrom is a nipple 15 which extends into the respective end of the hose 13 and has formed therewith an external screw thread 16 which permits said nipple to be screwed into the hose 13 and thereby materially assist in holding the same. In the outer end of each head 14 is a recess 17 having internal screw-threads for the adaptor heretofore mentioned. Formed in each head 14 and its nipple 15 is an axial passageway 18 which connects the passageway in the hose 13 with the recess 17.

Each sleeve 9 is secured to the respective end of the hose 13 by ribs 19 and barbs 20 pressed from said sleeve and into the hose 13. The ribs 19 extend longitudinally of the sleeves 9 and are circumferentially spaced and the barbs 20 are on the bottoms of the rib 19, project forwardly and inwardly therefrom and prevent the hose 13 from being drawn endwise from the nipples 15.

In addition to the nipples 15 the hose 13 is further connected to the coupling heads 14 by the sleeves 9 which have on their outer ends internal flanges 21 that extend into external annular grooves or channels 22 in said heads.

To prevent the hose 13 from being pinched between the links 8 and sleeves 9 at their joints during angular movement of said links and sleeves the casing 7 is provided with a metallic lining. This lining, as shown, is made up of diametrically opposite pairs of spring members 23 at each end portion of the casing 7 and which members extend longitudinally in said casing and in cross-section, have substantially the same curvature as the casing 7. These pairs of lining members 23 are midway between the pivot pins 10 of the several pairs and have their outer ends secured by rivets to the inner end portions of the sleeves 9. The outer end portions of the pairs of lining members 23, at each side of the casing 7, loosely rest the one upon the other with freedom for endwise sliding movement upon each other, as well as the casing 7 and the hose 13 during angular movement of the casing 7.

It may be here stated that the adapters, not shown, will be screwed into the recesses 17 in the heads 14 and may take various different forms for connecting one end of the hose 13 to a source of grease supply under pressure and the other end thereof to a coupler for connecting the hose to one of the nipples in the greasing system of an automotive vehicle.

From the above description it is evident that the casing 7 will permit the required angular movement of the hose 13 to apply the coupler attached thereto to anyone of the nipples in the greasing system of an automotive vehicle. It is also evident that the casing 7 will always completely encase the hose 13 when bent to any limit within the angular movement of the casing 7 and thus prevent the hose from being forced through the joints in the casing under the force of the high pressure produced therein.

Referring now to the modification shown in Fig. 6, the construction is the same as that illustrated in Figs. 1 to 5, inclusive, with the exception that the pairs of pivot pins are alternately turned 180° in respect to each other thus giving the casing additional angular movement. The parts of the casing shown in Fig. 6 are given the same reference characters as corresponding parts in the casing 7 followed by a prime.

What I claim is:

1. A device of the class described comprising a plurality of axially spaced tubular links telescopically assembled and connected for angular movement, and a metallic lining for the links comprising spring members in the form of leaves that extend longitudinally of the device and are anchored thereto with freedom to permit longitudinal movement of the links in respect thereto during their angular movement.

2. A device of the class described comprising a plurality of axially spaced tubular links telescopically assembled and connected for angular movement, and a metallic lining for the links comprising a pair of circumferentially spaced spring members that extend longitudinally of the device and are anchored at their outer ends to the device with their inner end portions in overlapping arrangement with freedom for longitudinal sliding movement, the one pair upon the other.

3. A device of the class described comprising a plurality of separate tubular links that are telescopically assembled and connected with freedom for limited relative endwise and angular movements and for limited relative turning movement about their axes.

In testimony whereof I affix my signature.

MARTINIUS DYSTHE.